Oct. 2, 1962     E. P. BECK     3,056,478
TENSION DEVICE AND BRAKE ASSEMBLY
Filed May 5, 1959     3 Sheets-Sheet 1
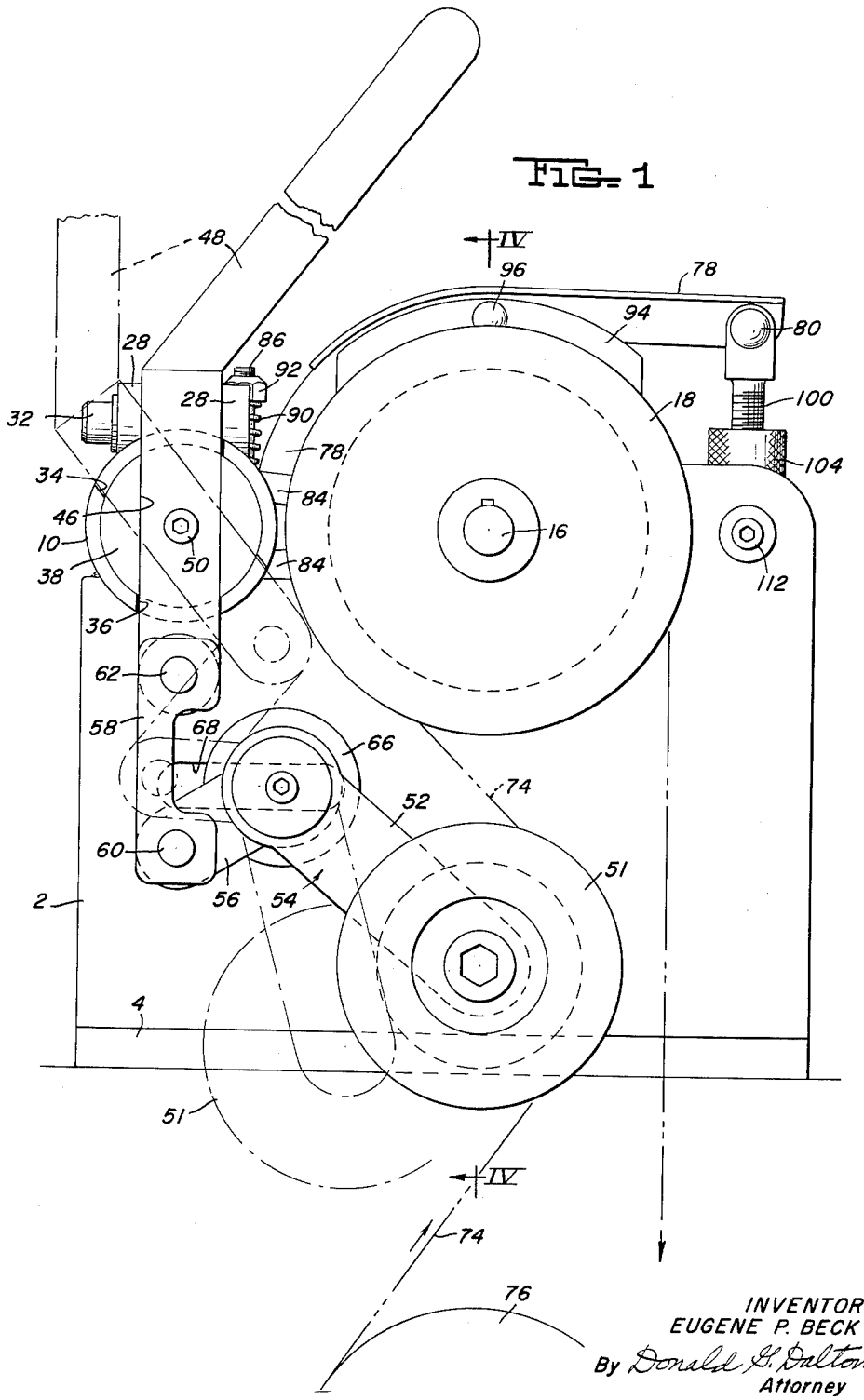
INVENTOR
EUGENE P. BECK
By Donald G. Dalton
Attorney

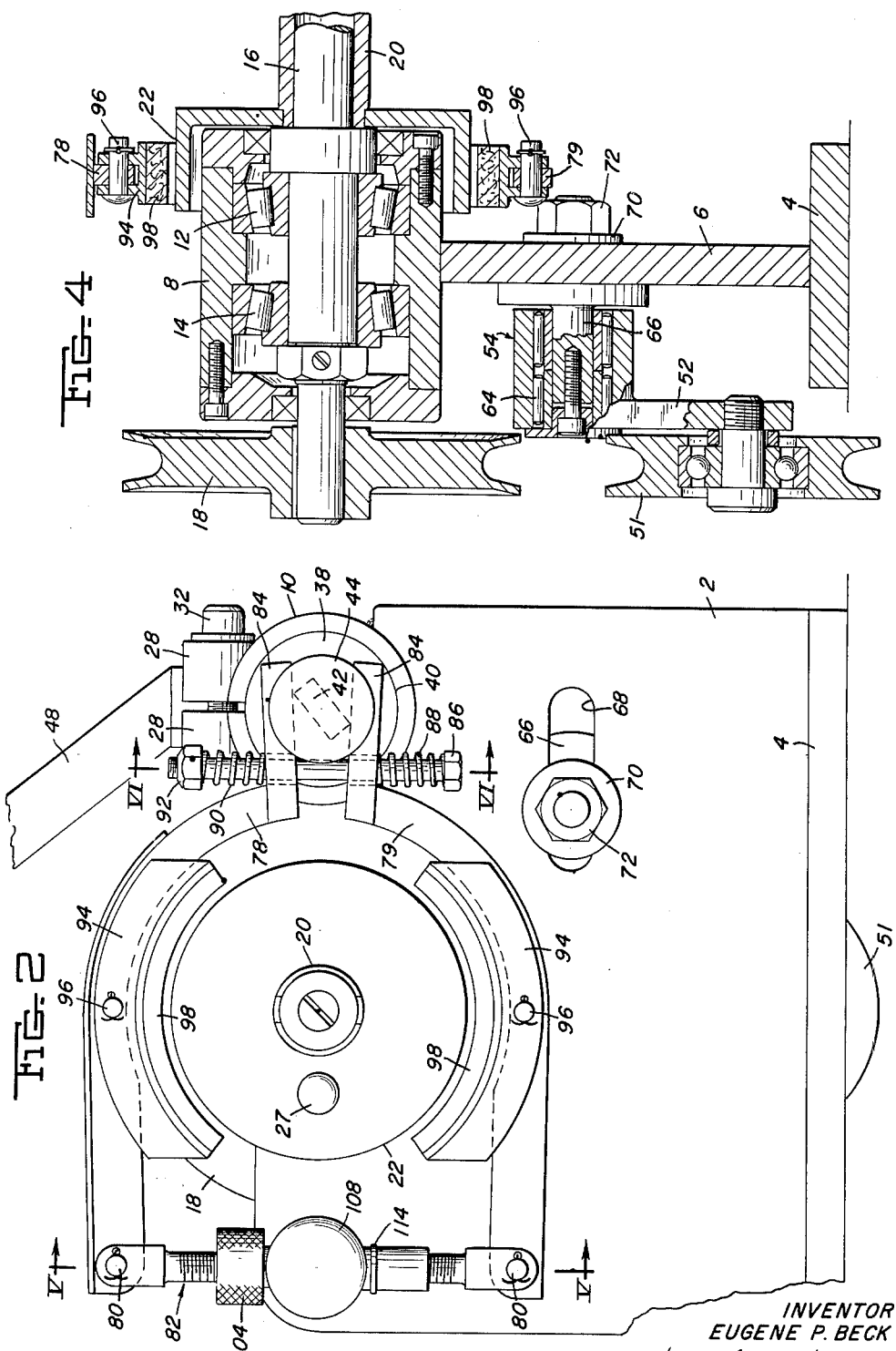

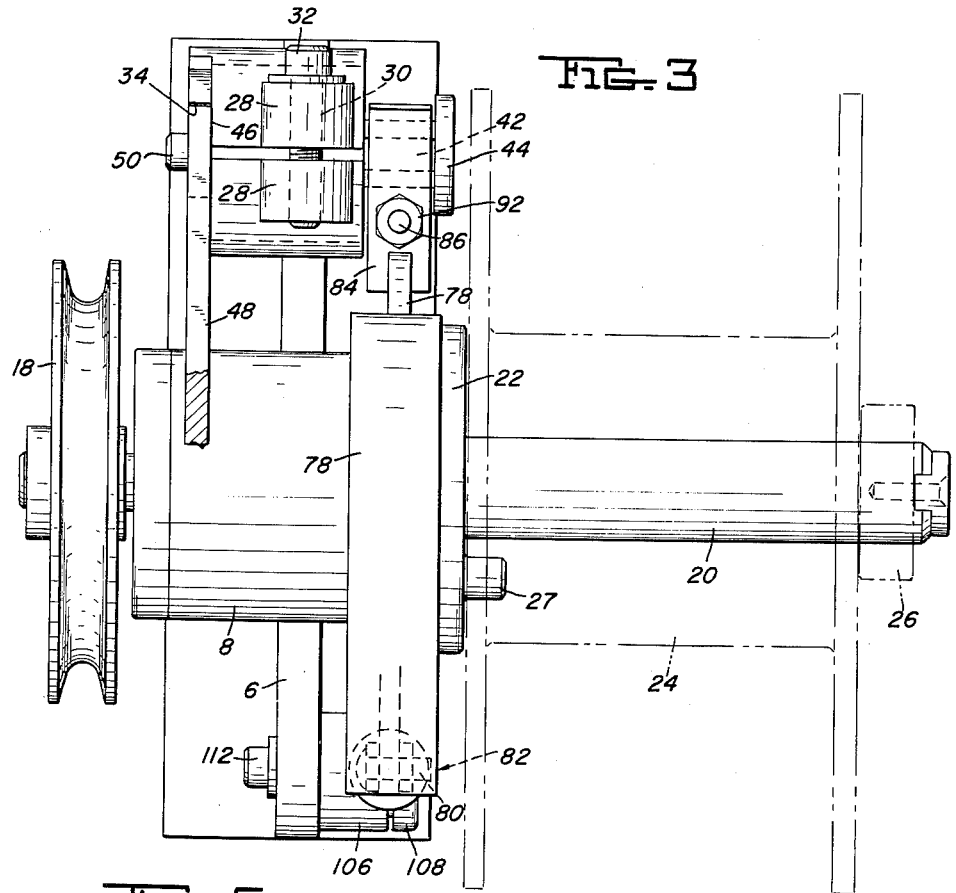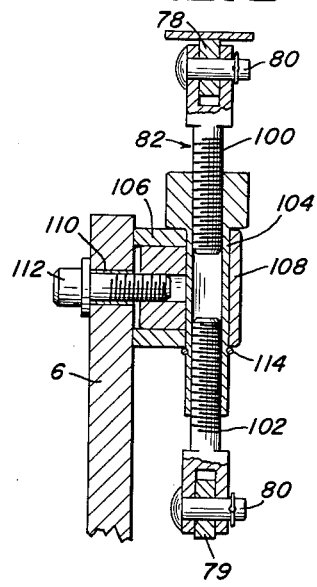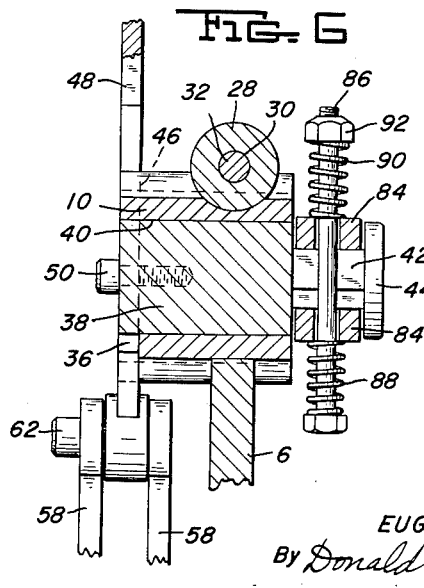

United States Patent Office 3,056,478
Patented Oct. 2, 1962

3,056,478
TENSION DEVICE AND BRAKE ASSEMBLY
Eugene P. Beck, Antioch, Calif., assignor to United States Steel Corporation, a corporation of New Jersey
Filed May 5, 1959, Ser. No. 811,038
5 Claims. (Cl. 192—11)

This invention relates to a tension device and brake assembly and more particularly to such an assembly for a spooling device for wire rope having a belt drive and a brake for the spooling spindle. In such devices, used prior to my invention, there was little co-operation between the brake and tensioning means and the brake could be applied while the power was still driving the spindle. Because of this arrangement there was danger of the operator being hurt. Also, the tension on the spooling spindle varied so that the rope being formed and spooled was not uniform.

It is therefore an object of my invention to provide a combined tension and braking assembly wherein the brake is applied as the tension is released and the brake is released as the tension is applied.

Another object is to provide a spooling machine in which uniform tension is applied to the rope by a spool.

Still another object is to provide an improved braking device for a spooling machine.

These and other objects will be more apparent after referring to the following specification and attached drawings, in which:

FIGURE 1 is a side elevation of the spooling machine with my invention incorporated therein;

FIGURE 2 is a view of the opposite side of the spooling machine of FIGURE 1, but showing the brake in engaging position;

FIGURE 3 is a top plan view of the spooling machine;

FIGURE 4 is a sectional view taken on the line IV—IV of FIGURE 1 with parts broken away;

FIGURE 5 is a sectional view taken on the line V—V of FIGURE 2; and

FIGURE 6 is a sectional view taken on the line VI—VI of FIGURE 2.

Referring more particularly to the drawings, reference numeral 2 indicates the machine frame. As shown the machine frame 2 includes a base 4, a vertical pedestal 6, a bearing housing 8 and a tubular brake release clamp 10. Bearings 12 and 14 are mounted in the housing 8 and rotatably support a spindle shaft 16. A pulley 18 is mounted on the left hand end of shaft 16 as shown in FIGURE 4. A spindle 20, having a brake drum 22 secured thereto, is mounted on the right hand end of shaft 16 as shown in FIGURE 4. A spool 24 is mounted on the spindle 20 and is held in place thereon by means of a nut 26. A pin 27 on the brake drum 22 fits into an opening in spool 24 to drive the same. The brake release pin clamp 10 is split at its upper end and has a pair of spaced ears 28 adjacent the split. Aligned openings 30, one of which is threaded, are provided in the ears 28 for receiving a tension screw 32. Slots 34 and 36 are provided in the brake release pin clamp 10 for a purpose which will appear later. A brake release pin 38 having a circular portion 40 is received in the brake release pin clamp 10. The right end of brake release pin 38 (FIGURE 6) is provided with a rectangular spacer 42 and a collar 44. A slot 46 is provided in the left end of circular portion 40 for receiving a handle 48. The handle 48 is held in place in the slot 46 by means of a cap screw 50 threaded into an opening in brake release pin 38. A tension pulley 51 is mounted on the outer end of arm 52 of a bell crank lever 54. Second arm 56 of bell crank lever 54 is connected to one end of a pair of links 58 by means of a pin 60. The other end of each link 58 is connected to the handle 48 by means of a pin 62. The bell crank lever 54 is pivotally mounted on bearings 64 which are mounted on a pivot pin 66. The pin 66 passes through a slot 68 in the pedestal 6 and is held in position by means of a washer 70 and nut 72. A belt 74 passes around pulleys 18 and 51 and is driven from a drive pulley 76. A pair of brake arms 78 and 79 are pivotally mounted by means of pins 80 to opposite ends of a turn buckle assembly 82. The brake arm 78 is T-shaped over most of its length. Each of the brake arms has a flat portion 84 at the end opposite pin 80. The flat portions 84 are arranged one on each side of the rectangular spacer 42. A bolt 86 passes through aligned openings in the flat portions 84 with a spring 88 surrounding the bolt between the bolt head and flat portion 84 and a spring 90 surrounding the bolt between the other flat portion 84 and a nut 92. The springs 88 and 90 maintain proper tension of the brake arms 78, 79 against the spacer 42. A brake shoe 94 is pivotally attached to each of the brake arms 78, 79 by means of a pin 96. A brake band 98 is secured to each of the brake shoes 94 in the usual manner. Turnbuckle assembly 82 consists of clevis 100 having a right hand thread, clevis 102 having a left hand thread, and locking nut 104. A tubular holder 106 is welded or otherwise fastened to the pedestal 6 for receiving a locking clamp 108 which has a vertical opening therein for receiving the nut 104. An opening 110 is provided in the pedestal 6 in axial alignment with the clamp holder 106 for receiving a tension screw 112 which is threaded into the clamp 108. A tru-arc ring 114 prevents turnbuckle nut 104 from moving vertically.

In operation, the handle 48 is moved to the full line position shown in FIGURE 1. This moves the pulley 51 to the full line position shown in FIGURE 1, thus causing the belt 74 to be driven from the pulley 76 which in turn rotates the shaft 16 and spool 24. Movement of the handle 48 also causes the rectangular spacer 42 to move from the position where the long sides are horizontal to the position shown in FIGURE 2, thus releasing the brake. This causes the cable (not shown) to be wound on spool 24. It will be noted that the axes of cap screw 50, pin 60 and pin 62 are in a common plane when maximum tension is being applied to the belt 74 so that the tension device cannot collapse while operating. The sides of slots 34 and 36 function to limit the amount of travel of handle 48 and pulley 51. Tension screw 32 is drawn tight enough to normally hold the handle 48 in any position where the operator places it. If the pulley 51 has not been moved to the position of maximum tension there will be an abrupt surge on the belt in the event of a cobble or sudden stoppages. This surge will kick out the handle, thus releasing the belt tension and applying the brake. Over a period of time the belt 74 stretches so that the proper tension will not be obtained. To adjust for proper tension the nut 72 is loosened and the pin 66 moved in the slot 68 to a position where maximum tension can again be obtained. As the brake bands 98 become worn it becomes necessary to adjust the position of the brake arms 78 and 79. This is done by loosening tension screw 112 and turning turnbuckle nut 104 to shorten the length of the turnbuckle. The tension screw 112 is then tightened against the locking clamp 108, thus preventing the turnbuckle from moving.

While one embodiment of my invention has been shown and described, it will be apparent that other adaptations and modifications may be made without departing from the scope of the following claims.

I claim:

1. A machine assembly comprising a frame, a spindle shaft mounted in said frame, a drive pulley, a driven pulley mounted on said spindle shaft, a tension pulley, a belt adapted to pass around said pulleys, a bell-crank lever mounted on said frame, one arm of said bell-crank lever rotatably carrying said tension pulley, a handle, a link connecting one end of said handle to the second arm of said bell-crank lever, a brake release pin pivotally mounted in said frame, a spacer on said brake release pin, a split clamp for rotatably supporting said brake release pin, means for adjusting the clamping pressure of said clamp on said brake release pin, means supporting said handle intermediate its length on said brake release pin for movement therewith, a brake drum for said spindle shaft, a brake arm partially surrounding said brake drum, and means operable by said spacer to release said brake arm when said handle moves said tension pulley into drive position and to engage said brake arm when said handle moves said tension pulley into idling position.

2. An assembly comprising a frame, a spindle shaft mounted in said frame, a drive pulley, a driven pulley mounted on said spindle shaft, a tension pulley, a belt adapted to pass around said pulleys, a bell-crank lever mounted on said frame, one arm of said bell-crank lever rotatably carrying said tension pulley, a handle, a link connecting one end of said handle to the second arm of said bell-crank lever, a brake release pin pivotally mounted in said frame, a spacer on said brake release pin, a split clamp for rotatably supporting said brake release pin, means for adjusting the clamping pressure of said clamp on said brake release pin, means supporting said handle intermediate its length on said brake release pin for movement therewith, a brake drum mounted for movement with said spindle shaft, a pair of brake arms partially surrounding said brake drum, means connecting one end of one brake arm to said frame, means connecting the other end of the other brake arm to said frame, a flat portion at the other end of said brake arms arranged on opposite sides of said spacer, and means urging said flat portions toward each other, movement of said handle to move said tension pulley into drive position also releasing said brake arms and movement of said handle moving said tension pulley into idling position also engaging said brake arms.

3. Apparatus for spooling cable or the like comprising a frame, a spindle shaft mounted in said frame, a spool mounted on said spindle shaft for movement therewith, a drive pulley, a driven pulley mounted on said spindle shaft, a tension pulley, a belt adapted to pass around said pulleys, a bell-crank lever mounted on said frame, one arm of said bell-crank lever rotatably carrying said tension pulley, a handle, a link connecting one end of said handle to the second arm of said bell-crank lever, a brake release pin pivotally mounted in said frame, a spacer on said brake release pin, a split clamp for rotatably supporting said brake release pin, means for adjusting the clamping pressure of said clamp on said brake release pin, means supporting said handle intermediate its length on said brake release pin for movement therewith, a brake drum mounted for movement with said spindle shaft, a pair of brake arms partially surrounding said brake drum, means connecting one end of one brake arm to said frame, means connecting the other end of the other brake arm to said frame, a flat portion at the other end of said brake arms arranged on opposite sides of said spacer, means urging said flat portions toward each other, movement of said handle to move said tension pulley into drive position also releasing said brake arms and movement of said handle to move said tension pulley into idling position also engaging said brake arms.

4. Apparatus for spooling cable or the like comprising a frame, a spindle shaft mounted in said frame, a spool mounted on said spindle shaft for movement therewith, a drive pulley, a driven pulley mounted on said spindle shaft, a tension pulley, a belt adapted to pass around said pulleys, a bell-crank lever mounted on said frame, one arm of said bell-crank lever rotatably carrying said tension pulley, a handle, a link connecting one end of said handle to the second arm of said bell-crank lever, a pin pivotally mounted in said frame, a split clamp for rotatably supporting said brake release pin, means for adjusting the clamping pressure of said clamp on said brake release pin, means supporting said handle intermediate its length on said pin for movement therewith, a brake drum mounted for movement with said spindle shaft, a brake arm partially surrounding said brake drum, and means operable by said pin to release said brake arm when said handle moves said tension pulley into drive position and to engage said brake arm when said handle moves said tension pulley into idling position.

5. Apparatus for spooling cable or the like comprising a frame, a spindle shaft mounted in said frame, a spool mounted on said spindle shaft for movement therewith, a drive pulley, a driven pulley mounted on said spindle shaft, a tension pulley, a belt adapted to pass around said pulleys, a bell-crank lever adjustably mounted on said frame, one arm of said bell-crank lever rotatably carrying said tension pulley, a handle, a link connecting one end of said handle to the second arm of said bell-crank lever, a brake release pin pivotally mounted in said frame, a rectangular spacer on said brake release pin, a split clamp for rotatably supporting said brake release pin, means for adjusting the clamping pressure of said clamp on said brake release pin, means supporting said handle intermediate its length on said brake release pin for movement therewith, a brake drum mounted for movement with said spindle shaft, a pair of brake arms partially surrounding said brake drum, a turnbuckle mounted on said frame, means connecting one end of one brake arm to one end of said turnbuckle, means connecting the other end of the other brake arm to the other end of said turnbuckle, a flat portion at the other end of said brake arms arranged on opposite sides of said rectangular spacer, means urging said flat portions toward each other, a brake shoe pivotally mounted on each of said brake arms, and a brake lining on each brake shoe, movement of said handle moving said tension pulley into drive position also releasing said brake arms and movement of said handle moving said tension pulley into idling position engaging said brake arms.

References Cited in the file of this patent

UNITED STATES PATENTS

| | | |
|---|---|---|
| 420,476 | Thayer | Feb. 4, 1890 |
| 867,483 | Darlington | Oct. 1, 1907 |
| 1,301,849 | Jones | Apr. 29, 1919 |
| 1,530,609 | O'Brien | Mar. 24, 1925 |
| 1,733,834 | Steele | Oct. 29, 1929 |
| 1,944,581 | Snyder | Jan. 23, 1934 |
| 2,233,798 | Robins | Mar. 4, 1941 |